United States Patent [19]

Lin

[11] Patent Number: 4,657,440
[45] Date of Patent: Apr. 14, 1987

[54] FENDER

[76] Inventor: Juei-Jse Lin, Room C, 11th Floor, No. 122, Sec. 4, Chung-Hsiao E Rd., Taipei, Taiwan

[21] Appl. No.: 685,495

[22] Filed: Dec. 24, 1984

[51] Int. Cl.$^4$ .............................................. E02B 3/22
[52] U.S. Cl. .................................... 405/213; 405/212; 114/220; 267/139
[58] Field of Search ............... 405/212, 211, 216, 215; 114/220, 219; 267/116, 139, 140; 256/1, 13.1

[56] References Cited

U.S. PATENT DOCUMENTS

| | | | |
|---|---|---|---|
| 2,420,677 | 5/1947 | Peterson | 405/212 |
| 2,424,635 | 7/1947 | Schwall | 114/219 X |
| 2,844,943 | 7/1958 | Kennedy | 114/220 X |
| 2,952,979 | 9/1960 | Rolando | 114/220 X |
| 3,145,685 | 8/1964 | Kulick | 114/220 |
| 3,528,383 | 9/1970 | Fetters | 114/220 |

FOREIGN PATENT DOCUMENTS

| | | | |
|---|---|---|---|
| 0079074 | 6/1981 | Japan | 114/219 |
| 627915 | 8/1949 | United Kingdom | 114/220 |
| 0493400 | 2/1976 | U.S.S.R. | 114/219 |
| 0582143 | 11/1977 | U.S.S.R. | 114/219 |

Primary Examiner—Dennis L. Taylor
Attorney, Agent, or Firm—Christensen, O'Connor, Johnson & Kindness

[57] ABSTRACT

A fender adapted to be mounted on a shore, for cushioning impacts applied by a ship to the shore installation, comprises first buffer elements 3, each of which has a circumferential surface for receiving impacts and an axial bore 3d, a horizontal shaft 2 rotatably passing through the axial bores, locking means 5 provided at the ends of the shaft for preventing the releasing movement of the first buffer elements 3 from the shaft, support members 8 adapted to be spacedly secured to the shore installation, and means 7 for suspending the shaft from the support members.

5 Claims, 5 Drawing Figures

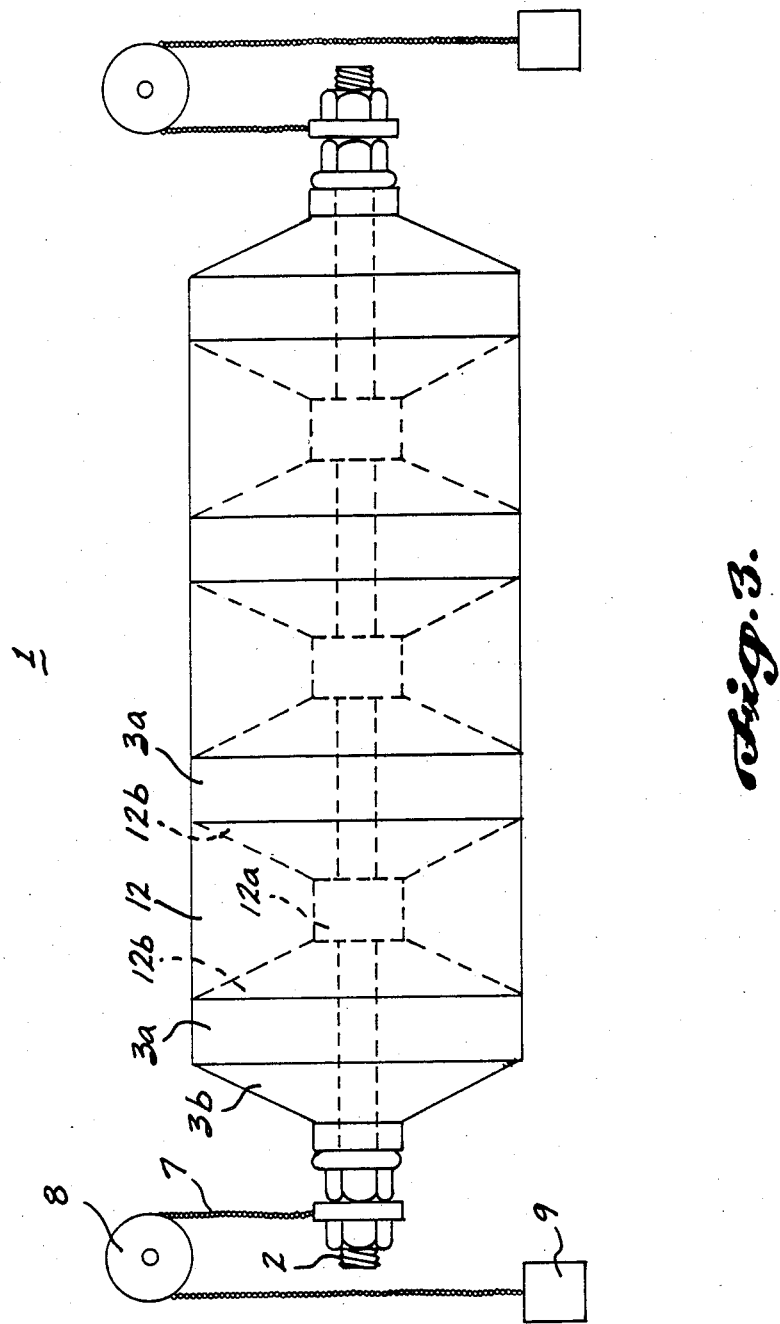

FENDER

BACKGROUND OF THE INVENTION

This invention relates to a fender used for cushioning impacts applied by a ship to a shore installation, such as, a quay or the like, and particularly to a fender which includes a plurality of rotatable buffer blocks mounted on a shaft.

Fenders for cushioning impacts applied by a ship to a shore installation proposed heretofore are of the types which are to be secured to the hulls of ships or shore installations. An example of such fenders is shown in FIG. 1. which is immovably secured to the shore installation at a location of certain height. Although such fenders are capable of absorbing shock energy and preventing the occurrence of hazardous friction between the side of the ship and the shore installation, they cannot offer a satisfactory service life due to the damage caused by the frequent impacts applied locally by a ship moored at the shore installation.

SUMMARY OF THE INVENTION

An object of the invention is to provide an improved fender of a movable type to avoid receiving impacts within a limited area, thereby increasing the service life of a fender.

Another object of the invention is to provide an improved fender of a movable type that can absorb shock energy as well as dissipate a portion of that energy.

These and other objects can be achieved in accordance with the invention through the provision of a fender which comprises: first buffer elements, each of which has a circumferential surface for receiving impacts and an axial bore; a horizontal shaft rotatably passing through the axial bore; locking means provided at the ends of the shaft for preventing the releasing movement of the first buffer elements from the shaft; support members adapted to be spacedly secured to the shore installation; and means for suspending the shaft from the support members.

According to one aspect of the invention, the first buffer element has a one-piece construction and has a first portion of annular cross-section, two second portions of truncated cone shape on two sides of the first portion and two tubular ends on two sides of the second portions. It further includes a metal tube insert fitted in the axial bore.

The locking means may include two nuts screwed to the shaft near its two ends on two sides of the assembly of buffer elements and two buffer rings respectively provided between the nuts and the first buffer elements. The support members may be two pulley members and the suspending means may include two steel chains attached to two ends of the shaft and passed over the pulley members. The ends of the steel chains are provided with weighting means which are placed in the water.

The presently preferred embodiments will be described in detail with reference to the accompanying drawings, in which:

BRIEF DESCRIPTION OF THE DRAWINGS

FIG. 3 is an elevation view of a fender of another embodiment;

DETAILED DESCRIPTION OF THE PREFERRED EMBODIMENT

Figure 1:
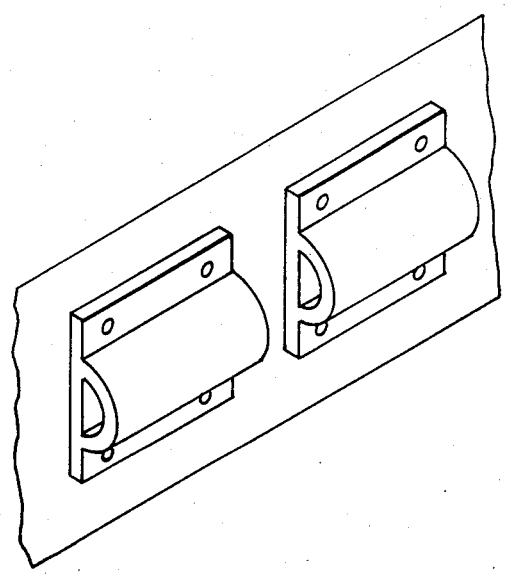
FIG. 1 is a perspective view of a fender in the prior art.
Figures 4, 5:
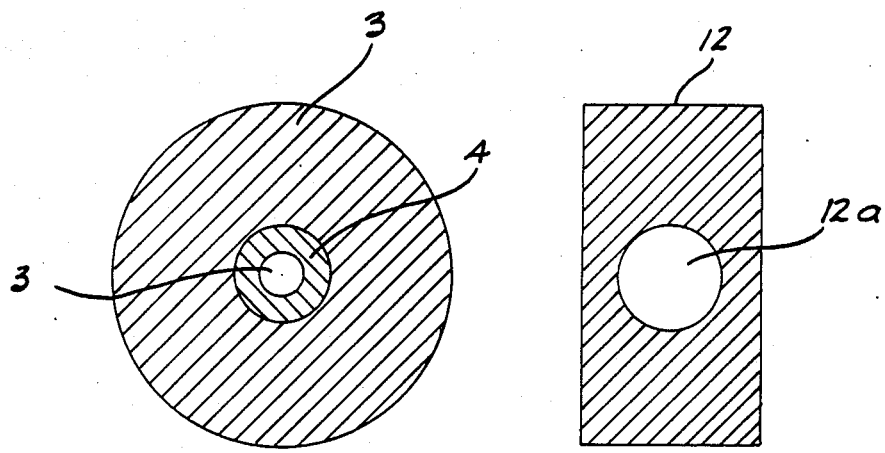
FIG. 4 is a sectional view of a second buffer block.
FIG. 5 is a sectional view of a first buffer block.
Figure 2:
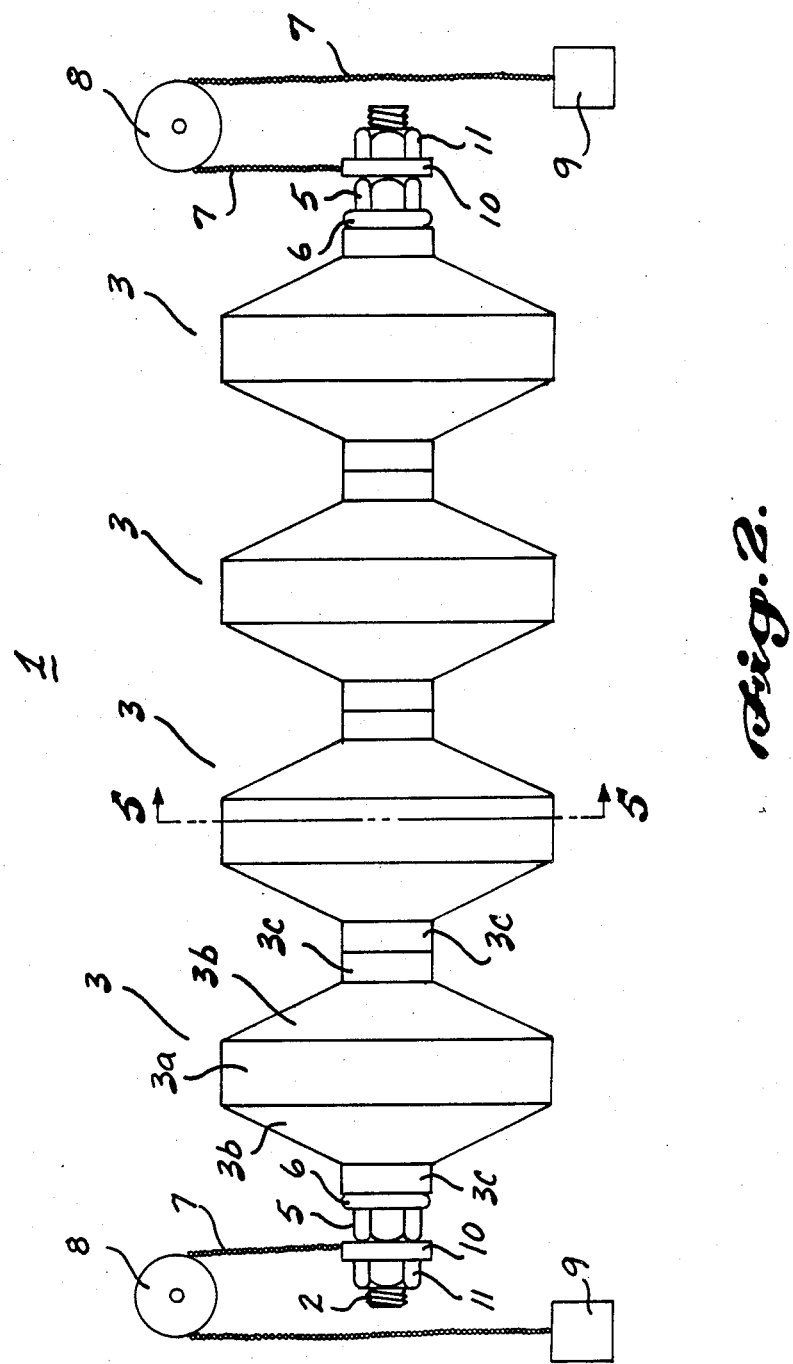
FIG. 2 is an elevation view of a fender embodying the present invention.

Referring to FIG. 2, there is shown a fender 1 which includes a shaft 2 passing through four first buffer blocks 3 each of which is a one-piece construction and has a portion 3a of annular cross-section, two truncated cone shaped portions 3b on two sides of the portion 3a, and two tubular ends 3c each on a side of one of the portions 3b. As shown in FIG. 5, there is further provided an axial bore 3d in each buffer block 3 in which is fitted a metal tube insert 4. Since the cross-section of the shaft 2 is smaller than the inside diameters of the metal tube inserts 4, all of the buffer blocks 3 can be rotated about the shaft 2.

Near the two ends of the shaft 2 are provided screw threads (not shown) for engaging nuts 5 which are attached to the shaft 2 for preventing the releasing movement of the buffer blocks 3 from the shaft 2. Between the nuts 5 and the tubular ends 3c of the buffer blocks 3 are further provided buffer rings 6.

There are further provided two pulleys 8 which are adapted for attachment to a shore installation. Over the pulleys 8 are respectively passed two steel chains 7 which have one end attached to the opposite ends of the shaft 2, respectively. The other ends of the chains 7 are provided with weighting members 9 which are to be placed in the water so that the buffer blocks 3 can be suspended at a certain height. The steel chains 7 are attached to the shaft 2 by means of two mounting rings 10 which are in turn retained by nuts 11.

As embodied herein, the fender 1 may further includes buffer blocks 12 to be disposed between the buffer blocks 3, as shown in FIGS. 3 and 4. Each of the buffer blocks 12 is in the shape of a rectangular cross-section and is provided with a bore which includes a cylindrical hollow portion 12a for being sleeved onto the tubular ends 3c of the two buffer blocks 3 and two truncated cone shaped hollow portions 12b for being sleeved onto the portions 3b of the buffer blocks 3.

When a ship is moored at the quay, it will apply successive impacts to the circumferential surfaces 3a of the buffer blocks 3. Since the buffer blocks 3 are rotatably mounted on a shaft and suspended from the pulleys, an impact applied by the ship will cause the buffer blocks 3 to rotate or to move in the longitudinal direction. This prevents the ship from applying the next impacts to the same locations on the surfaces of the buffer blocks 3. In addition, the rotary movements of the buffer blocks 3 will also dissipate the shock energy applied to their circumferential surfaces, thereby reducing the magnitude of the impacts to be absorbed by the fender.

With the invention thus explained, it is apparent that various modifications and variations can be made without departing from the scope of the invention. It is therefore intended that the invention be limited within the scope as indicated in the appended claims.

What is claimed is:

1. A displaceable fender comprising:
a shaft;
a buffer means rotatably mounted on said shaft;

locking means attached proximal to the ends of said shaft for preventing the release of said buffer means from said shaft;

two pulley members adapted to be mounted to a shore installation;

two suspending means on said pulley members, one end of each of said suspending means being attached to one end of said shaft; and weighting means attached to the free end of each of said suspending means for permitting displacement of said fender upon impact.

2. A displaceable fender according to claim 1, wherein said buffer means comprises a plurality of first buffer elements of one-piece construction, each of which has a first portion of annular cross section, two truncated cone-shaped second portions on both sides of said first portion, and two tubular end portions on the sides of each said second portion, said first buffer elements positioned concentrically and rotatably around said horizontal shaft.

3. A displaceable fender according to claim 2, wherein said buffer means further comprises second buffer elements interposed between adjacent first buffer elements, and enclosing the second truncated cone-shaped portion and the tubular end portion of each adjacent first buffer element, and each of said second buffer elements having a rectangular cross section and provided with an axial bore conforming to the shape of said second truncated cone-shaped and tubular end portions of said first buffer elements.

4. A displaceable fender according to claim 1, wherein said locking means comprises two pairs of nuts attached to said horizontal shaft proximal to its ends on either side of said plurality of first buffer elements, and ring members provided between each said pair of nuts and said first buffer elements.

5. A displaceable fender according to claim 1, wherein said suspending means comprises two chains, each said chain passing over one pulley member and one end of each of said chain attached to one end of said horizontal shaft, and the free end of said chain attached to one of two said weighting members.

* * * * *

UNITED STATES PATENT AND TRADEMARK OFFICE
CERTIFICATE OF CORRECTION

PATENT NO. : 4,657,440

DATED : April 14, 1987

INVENTOR(S) : Juei-Jse Lin

It is certified that error appears in the above-identified patent and that said Letters Patent is hereby corrected as shown below:

Column 2, Lines 38/39, "includes" should be --include--

Abstract, Line 1, Insert --installation-- after "shore"

Signed and Sealed this

Eighteenth Day of August, 1987

*Attest:*

DONALD J. QUIGG

*Attesting Officer*  *Commissioner of Patents and Trademarks*